July 12, 1955
W. T. GRAHAM
2,712,780
VIBRATING PLOW AND MOUNTING THEREFOR
Filed June 8, 1951
5 Sheets-Sheet 1
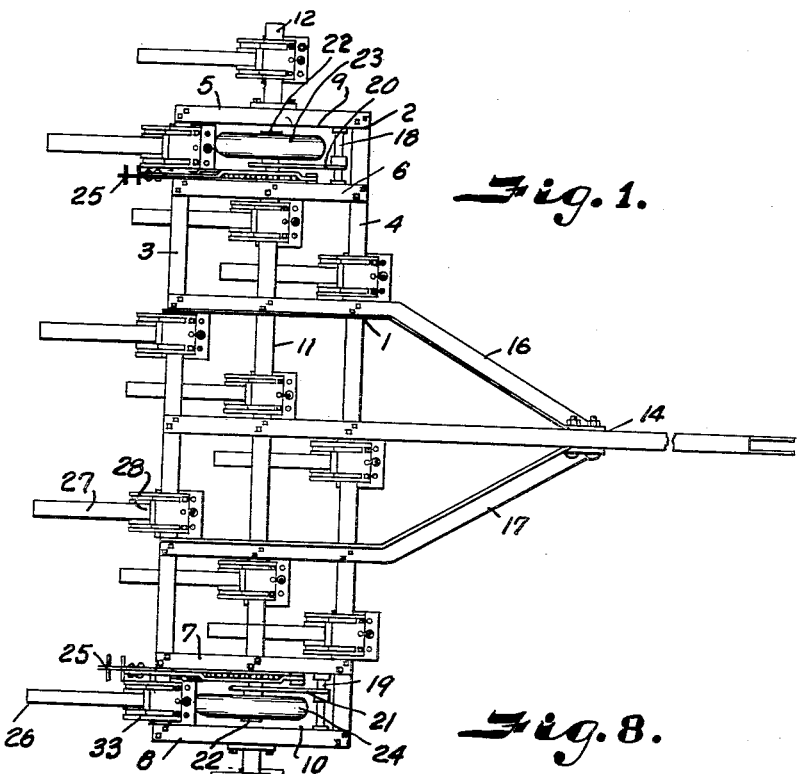
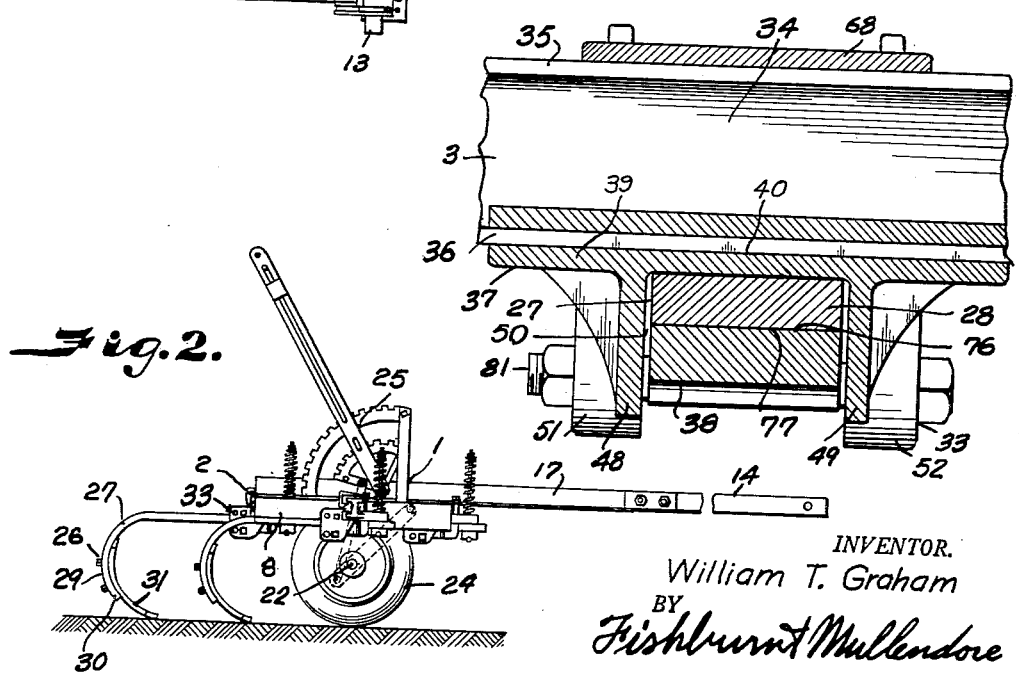
INVENTOR.
William T. Graham
BY
Fishburn & Mullendore
ATTORNEYS July 12, 1955  W. T. GRAHAM  2,712,780
VIBRATING PLOW AND MOUNTING THEREFOR
Filed June 8, 1951  5 Sheets-Sheet 2

INVENTOR.
William T. Graham
BY
Fishburn & Mullendor
ATTORNEYS

July 12, 1955
W. T. GRAHAM
2,712,780
VIBRATING PLOW AND MOUNTING THEREFOR
Filed June 8, 1951
5 Sheets-Sheet 3
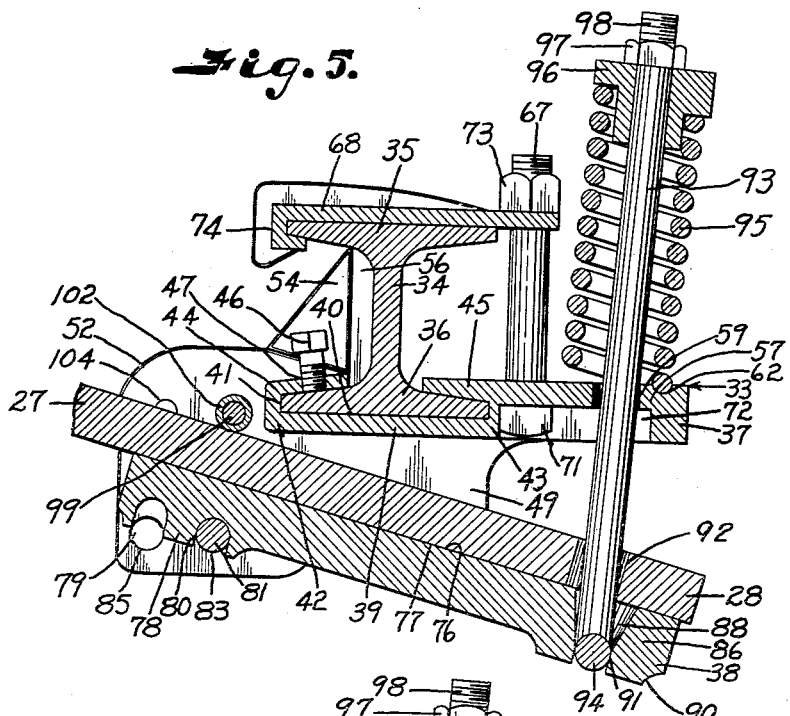
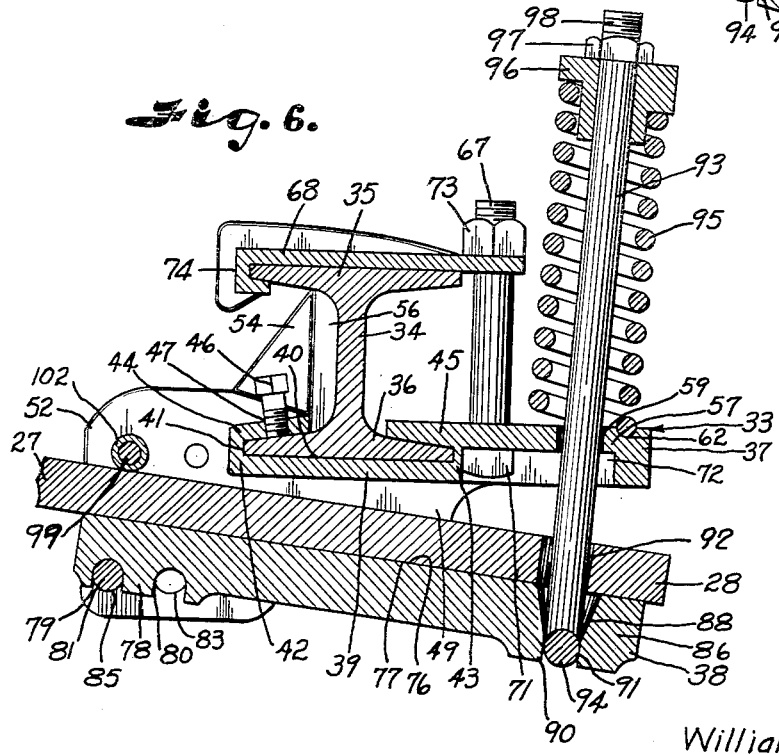
INVENTOR.
William T. Graham
BY
Fishburn & Mullendore
ATTORNEYS July 12, 1955

W. T. GRAHAM 2,712,780

VIBRATING PLOW AND MOUNTING THEREFOR

Filed June 8, 1951

INVENTOR.
William T. Graham
BY
Fishburn & Mullendore
ATTORNEYS

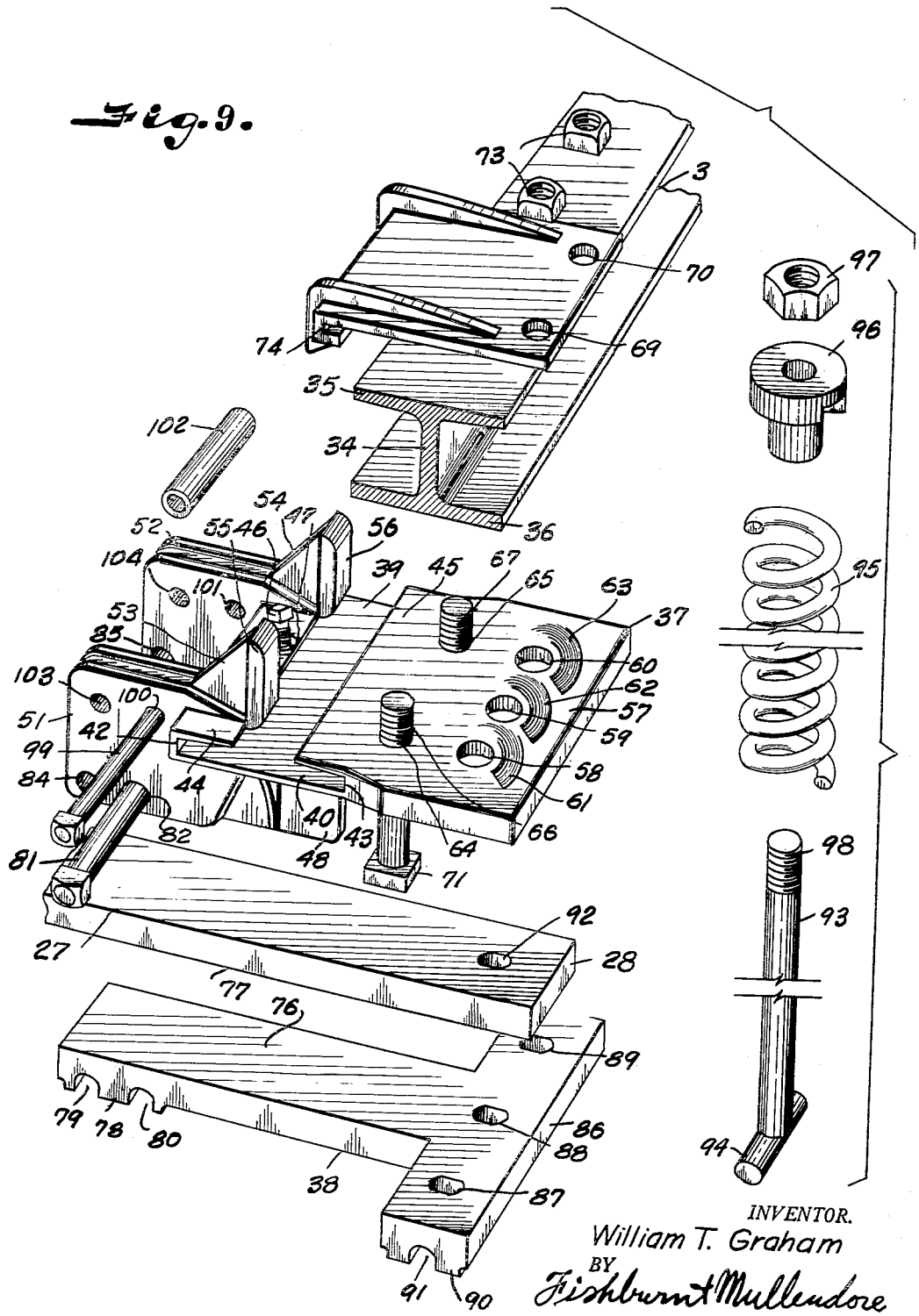

United States Patent Office 2,712,780
Patented July 12, 1955

2,712,780

VIBRATING PLOW AND MOUNTING THEREFOR

William T. Graham, Amarillo, Tex., assignor to The First National Bank of Amarillo, Amarillo, Tex., a corporation Application June 8, 1951, Serial No. 230,539

1 Claim. (Cl. 97—47.84)

This invention relates to plows of a type including a plurality of laterally arranged ground conditioning tools that work under the surface to heave and break the soil and form alternate ridges and furrows having exposed surfaces composed of clods, straw, and other natural mulching material normally occurring on a field, the present invention being directed to an improvement on the "Vibrating Plow and Mounting Therefor" covered in Patent No. 2,493,811, granted to me on January 10, 1950.

In the plow disclosed in the patent, the ground working tools are provided with shanks that are adapted to rock relatively to the frame when the plow is in operation in a forward direction to give vibratory action and to permit the tools to ride over rocks and other obstructions that may be encountered in the soil and thereby avoid damage to the plow parts and plow frame disclosed in the patent. The tool mounting includes a clamp having one part fixed to the frame and another part pivotally mounted on the fixed part with the end of the shank clampingly engaged therebetween under action of a coil spring which has one end in engagement with one of the clamp parts and the other end connected with the other clamp part in a manner to form a stop for preventing disengagement of the shank from the clamp.

Such a mounting operates satisfactorily, but shifting of the fulcrums from the pivotal connections of the clamp parts during rocking movement of the plow shanks results in wear of the fixed part of the clamp, and if the worn part of the clamp is not replaced, the wear often extends into the supporting part of the plow frame.

It is therefore an object of the present invention to provide the fixed clamp part of each clamp with an inexpensive and readily replaceable element on which the sliding action takes place and thereby prevent wear on the major and more costly part of the clamp. Another object of the invention is to provide the clamps with a hinge or pivot pin that may be shifted to vary the effective leverage of the shank on the retaining spring to vary the action thereof according to the conditions under which the plow is to be used.

Another object of the invention is to provide the clamp with a plurality of spring seats so that each clamp may be equipped with a plurality of springs depending upon the spring action which is required under the particular working conditions of the plow.

A further object of the invention is to provide a more rugged heavy duty clamp structure to better withstand the rigorous action to which the clamps and plow frame are subjected when the plow is working in heavy and rocky soils.

In accomplishing these and other objects of the invention hereinafter pointed out, I have provided improved structure, the preferred forms of which are illustrated in the accompanying drawings, wherein:

Fig. 1 is a plan view of a plow embodying the features of the present invention.

Fig. 2 is a side elevational view of the plow.

Fig. 5 is a similar section showing shank in rocking position as when the ground working tool passes over an obstruction in the ground.

Fig. 6 is a view similar to Fig. 5 but showing a different position of the backing and fulcrum pins.

Fig. 7 is a cross section on the line 7—7, Fig. 4.

Fig. 8 is a cross section on the line 8—8, Fig. 4.

Fig. 9 is a perspective view of the portion of the plow shank, a part of the frame, and the component parts of the mounting clamp shown in disassembled spaced relation to better illustrate the construction thereof.

Fig. 10 is a perspective view similar to Fig. 3 but showing the clamp equipped with a plurality of springs.

Fig. 11 is a fragmentary section on the line 11 of Fig. 10.

Figure 3:
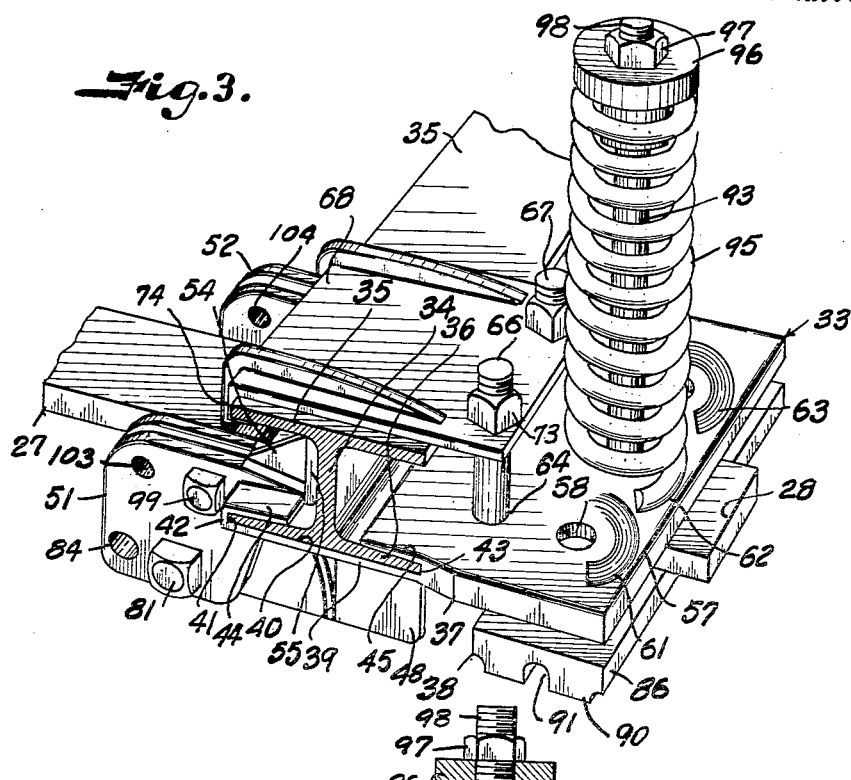
Fig. 3 is a perspective view of a portion of one of the shanks and a portion of the plow frame together with the mounting by which the shank is attached to the frame in accordance with the present invention.

Referring more in detail to the drawings:

1 designates a plow constructed in accordance with the present invention and which includes a frame 2 composed of transverse beams 3 and 4 spaced apart at the ends thereof by pairs of longitudinal beams 5—6 and 7—8 and which provide wheel pockets 9 and 10. The frame also includes an intermediate transverse beam 11 connecting the innermost longitudinal members 6 and 7. The frame also includes extensions 12 and 13 attached to the outermost longitudinal members 5 and 8 in alignment with the transverse beam 11. Extending across the mid-portions of the transverse beams and suitably connected therewith is a tongue 14 having its forward end arranged for connection with the draft bar of a tractor (not shown). The tongue 14 is suitably braced relatively to the frame by bars 16 and 17. Mounted at the forward end of the wheel pockets 9 and 10 and carried between the pairs of longitudinal members 5—6 and 7—8 are shafts 18 and 19, carrying arms 20 and 21 having wheel spindles 22 for journalling ground wheels 23 and 24. The frame 2 is adapted to be raised and lowered with respect to the wheels 23 and 24 by lever mechanisms 25 connected with the free ends of the arms 20 and 21.

Carried in spaced relation along the lengths of the transverse beams are ground working devices 26 with the ground working devices on one beam staggered in respect to those on the other beams to form a plurality of spaced apart furrows when the plow is in use.

Each ground working device includes a shank 27 of substantially rectangular cross section and of a width and thickness to provide the necessary strength and a certain amount of resiliency. Each shank includes a substantially straight portion 28 to extend in the direction of travel of the machine and a rearwardly and downwardly curved portion 29 terminating in a forwardly curved end 30 for mounting the ground working tools 31.

The straight ends of the shanks extend transversely with respect to the transverse beams and are attached thereto by clamping devices 33 embodying the features of the present invention.

The transverse frame members are preferably of I-beam cross section and are arranged in the frame with vertical webs 34 and flanges 35 and 36 horizontally disposed to attach the shanks of the ground working tools by the clamps or mounting devices 33.

The mounting devices are of identical construction and each includes a fixed clamping part 37 and a movable clamping part 38 pivotally connected therewith, to engage therebetween the forward end 28 of a shank 27.

The fixed clamping part 37 has a plate portion 39 provided with a flat face 40 corresponding to the width of the lower flanges 36 of the I-beams and which is adapted to closely engage therewith. Projecting from the front and rear sides of the plate portion 39 and extending vertically at the outer edges 41 of the lower flanges 36 are wall portions 42 and 43 carrying inwardly extending flanges 44 and 45 that engage over the upper faces of the lower flange 36 on the respective sides of the web portion 34. The length of the plate portion 39 is such as to provide ample contact area with the flange 36 so as to assure a firm connection when the clamp is fastened thereto by a fastening device such as a set screw 46. The set screw 46 is threaded through a boss 47 on the upper face of the inturned flanges 44 and the shank thereof bears against the upper face of the flange 36 to draw the plate portions 39 of the clamp parts tightly against the bottom faces of the lower flanges. Depending from the underside of the plate portion 39 of each clamp are flanges 48 and 49 spaced apart to provide an open bottom channel or way 50 in which the portion 28 of a shank 27 is resiliently anchored as later described.

The flanges 48 and 49 extend rearwardly from the plate portion and upwardly over the flange 44 to provide rearwardly projecting, spaced apart ears 51 and 52 that are preferably thicker than the depending flanges. Extending upwardly from the portion of the ears overlying the flange 44 are webs 53 and 54 carrying pads 55 and 56 adapted to engage the rear face of the web 34 for distributing forces applied to the clamp to the web and upper portion of the transverse frame members and thereby avoid tendency of bending the lower flanges to which the clamps are directly attached. The forward side of the plate portion 39 projects to provide a seat 57 for one or more springs that may be required to hold the parts of the clamp in resiliently held together association as later described.

The seat portion 57 is relatively thick to provide the necessary strength and accommodate a plurality of spaced openings 58, 59 and 60 partially surrounded by spring seating grooves 61, 62 and 63. Also formed in the projecting seat portion of the clamp part are spaced openings 64 and 65 for passing fastening devices such as bolts 66 and 67, to cooperate with the set screw in securing the clamp and to connect a plate 68 that overlies the upper flange 35 of the beam members and which has openings 69 and 70 therein to pass the shanks of the bolts 66 and 67. The bolts are inserted with the heads 71 inset in a recess 72 on the underside of the spring seating portion of the clamp and with the threaded shanks extending upwardly through the openings 69 and 70 to receive nuts 73 by which that side of the fixed clamping part and the overlying plate 68 are drawn in fixed engagement with the upper and lower faces of the transverse frame members. The opposite side of each plate 68 is provided with a depending hook-shaped flange 74 that engages over the rear edge of the upper flange 35 to secure that side of the plate.

Each clamp also includes the pivotal clamp part or fulcrum member 38 having a clamping face 76 conforming with the lower face 77 of the forward end portion of the tool supporting shank. The member 38 has a transverse rib 78 on the underside thereof and which has spaced transverse grooves 79 and 80 extending thereacross and opening downwardly to accommodate a pivot or fulcrum pin 81 that projects transversely between the ears of the fixed clamping part and which has its ends extending through registering openings 82 and 83 or 84 and 85 depending upon the desired effective length of the lever as later described.

Figure 4:
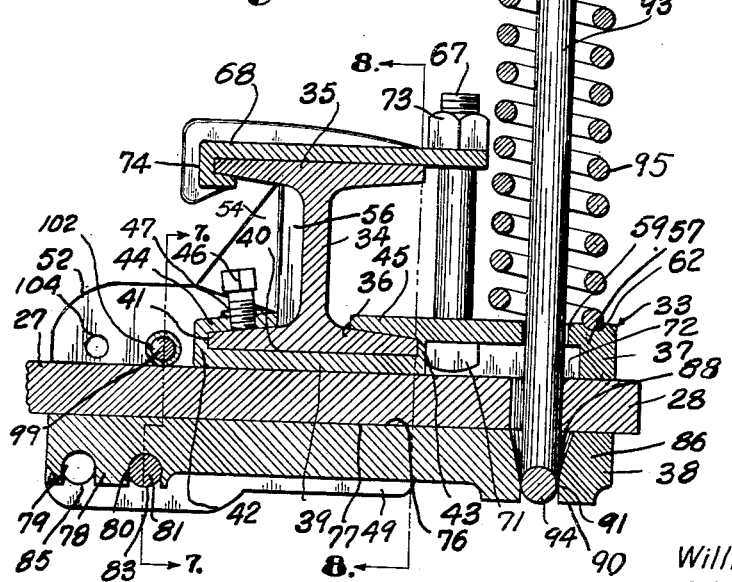
Fig. 4 is a longitudinal section through the clamp, the parts being shown in idle position.

The opposite end of the fulcrum member terminates in a transverse head 86 having slot-like openings 87, 88 and 89 therein registering with the openings 58, 59 and 60, previously described. Formed on the underside of the head is a rib 90 provided with a single transverse groove 91 intersecting the slot-like openings 87, 88 and 89. The forward end of each shank is provided with an elongated opening 92 that registers with the center openings 88 and 59 to extend a T-bolt or rod member 93 therethrough, the T-shaped head 94 being adapted to rock within the groove 91. The rod 93 extends upwardly through the slot-like openings 88, 92, and 59 and projects a substantial distance above the seat portion of the fixed clamping part as shown in Fig. 4. Sleeved over the rod having one end engaging in the spring seating groove 62 is a coil spring 95 having its opposite end engaging a spring seat or washer 96 that is sleeved on the upper end of the rod and retained against the spring by an adjusting nut 97 mounted on the threaded end 98 of the rod as best shown in Figs. 3 and 4. Upon tightening of the nut 97, the spring 95 is thus retained in compression to keep the head 94 thereof in rocking engagement with the groove 91 to retain the clamping face 76 of the fulcrum member in clamping contact with the underside of the shank and the upper face of the shank in clamping contact with the lower face of the plate portion 39. The ground working tools are thus resiliently supported between the fixed and movable parts of the clamps and are adapted to rock thereon as permitted by the springs to effect a pumping or vibrating action of the ground working tools incidental to drag of the tools through the ground and resiliency of the compression springs.

If less action is required, the rod 93 may be removed and placed through one of the outermost sets of registering openings in the clamping parts and a similar rod placed through the registering openings at the opposite side of the clamp as shown in Fig. 10. The springs 95 are then sleeved over the projecting ends of the T-rods with their lower ends engaging in the spring seats 61 and 62. Spring seating washers 96 are applied over the threaded ends of the T-rods to engage the upper ends of the springs, the washers being retained by nuts 97 applied to the threaded ends of the rods.

If less spring action is desired with either one or a plurality of springs, the bolt 81 may be removed from the openings 82 and 83 and reinserted through openings 84 and 85 registering with the groove 79. With this arrangement, the effective length of the leverage is increased to reduce the spring action (see Fig. 6).

The shank is retained in the clamp by a bolt 106 (Figs. 10 and 11) that is passed through the opening 92 in shank and opening 88 of the clamping part 38. The nut 107 of the bolt is not drawn up tight but is left sufficiently loose to permit sliding movement of the shank relatively to the clamping part 38.

When the shanks pivot on the bolts or pins 81, the fulcrum points shift to the underside of the plate portion 39 so that there is relative rocking movement between the upper faces of the shanks and the underfaces of the fixed clamping parts which would result in wear. To avoid this difficulty, a removable fulcrum member 99 is inserted transversely of the upper face of each shank in rearwardly spaced relation to the web portion 42 of each fixed clamp, as best shown in Figs. 4 to 7 inclusive. This fulcrum member includes a bolt 99 extending through registering openings 100 and 101 in the upper portion of the ears 51 and 52. The bolts mount removable sleeves or rollers 102 so that the rocking pressure is applied to the sleeves rather than to the underside of the plate portions 39 of the fixed clamping part. When longer leverage is desired, the bolts 99 and sleeves 102 are shifted rearwardly and the bolts are passed through registering openings 103 and 104 that are provided in the ears above the rearmost openings that register with the groove 79 (see Fig. 6).

In using the plow equipped with ground working devices as above described, the tongue 12 of the plow is attached to the draft bar of a tractor to be drawn thereby over the field to be plowed. When the plow is in position to start the furrows, the lever mechanisms 25 are actuated to lower the frame with respect to the wheels so that the ground working tools enter the soil to a depth as set by the lever mechanisms. Pull on the frame in a forward direction and resistance to the pull offered by the ground working tools in the opposite direction as by rocks or other obstructions causes the shanks to rock on the pivot pins 81 so that the ends 28 will cause the fulcrum plates or movable parts 38 of the clamps to move away from the fixed parts 37 under resistance of the spring or springs 95 and back to normal position under action of the springs when the tools slide over the rock or other obstruction.

When the fulcrum members pivot away from the fixed clamping parts, the upper face of the shanks rock against the rollers 102 so that sliding pressure is relieved from the fixed clamping parts (Figs. 5 and 6); therefore, the wear is taken by the rollers 102 and bolts 99 that support them.

Forces applied to the mounting clamps are distributed to the webs 34 and upper flanges of the transverse I-beams by means of the pads 55 and 56, plates 68, and bolts 66 and 67 so as to avoid bending and twisting of the flanges.

If a single spring is being used for each clamp and a greater resistance to pivoting of the plow shanks is desired, this may be effected by using a plurality of springs on each clamp, applied as above pointed out and shown in Fig. 10.

The leverages may be changed to suit the desired working conditions of the plow by shifting the pins 81 and 99 in the openings of the ears 51 and 52 as shown in Fig. 6. In this way, leverage may be changed without shifting of the clamp parts with respect to the plow shanks.

When a single spring is used for each clamp, the rods 93 passing through the openings 92 of the shanks support the shanks by the clamping parts and limit movement thereof; however, when a plurality of springs are used, the bolt 106 is used through the openings 88 and 92 as shown in Figs. 10 and 11.

During operation of the plow, there is also a vibratory or pumping movement of the ground working tools that acts to reduce the draft and facilitate movement of the plow. The pumping action of the ground working tools works the fine soil downwardly to form the seed bed and the larger clods, straw and other mulching material are worked to the surface for covering the fine soil and for serving as a mulch to preserve the moisture.

From the foregoing, it is obvious that I have provided a plow structure wherein the shanks of the ground working tools are attached to the plow frame in a manner to permit the desired action without excessive wear on the major parts of the clamps and that the wear is applied to small, inexpensive, replaceable parts.

It is also obvious that I have provided a clamp structure for mounting the plow shanks to give the desired spring action by using one or more springs for each clamp and by changing the fulcrums on which the plow shanks and movable parts of the clamps are adapted to pivot.

What I claim and desire to secure by Letters Patent is:

In a plow having a frame and a ground working tool provided with the shank adapted to rock relatively to the frame when the plow is in operation in a forward direction, a mounting for attaching and supporting the shank of the ground working tool from the frame including a clamping part fixed to the frame and having a clamping face normally contacting a corresponding face on an end of the shank when the shank is at rest, a movable clamping part, a pin pivotally mounting the movable clamping part on the fixed clamping part with the end portion of the shank engaged between said parts and movable relatively thereto upon rocking movement of the shank, resilient means connecting said clamping parts to hold said clamping parts and shank in resiliently held together association so that when the shank is rocked the end portion of the shank between the clamping parts will cause the movable clamping part to move away from the fixed clamping part along with said end portion of the shank and back to normal position with the end portion of the shank contactingly held between the clamping parts and with said clamping faces in engagement with each other, a pin carried by the fixed clamping part at the end of the clamping face nearest said pivot pin, and a roller on the last named pin and freely rotatable relatively to the fixed clamping part and having rolling tangential contact with the shank and throughout the rocking movement of the shank and to cooperate with the pin which mounts the movable clamping part in supporting the shank and in limiting separation of the shank and movable part of the clamp during rocking movement.

References Cited in the file of this patent

UNITED STATES PATENTS

| 417,775 | Drader et al. | Dec. 24, 1889 |
| 875,211 | Reeves et al. | Dec. 21, 1907 |
| 921,572 | Walters | May 11, 1909 |
| 2,014,451 | Pfeifer | Sept. 17, 1935 |
| 2,493,811 | Graham | Jan. 10, 1950 |

FOREIGN PATENTS

| 111,910 | Australia | Nov. 8, 1940 |
| 269,394 | Great Britain | Apr. 21, 1927 |